United States Patent [19]
Krishnapillai

[11] Patent Number: 5,167,100
[45] Date of Patent: Dec. 1, 1992

[54] DEPLOYABLE STRUCTURES

[76] Inventor: Anandasivam Krishnapillai, 28 Rockingham St., Cambridge, Mass. 02139

[21] Appl. No.: 219,548

[22] Filed: May 13, 1988

Related U.S. Application Data

[63] Continuation of Ser. No. 101,705, Sep. 28, 1987, abandoned, which is a continuation of Ser. No. 874,334, Jun. 12, 1986, abandoned.

[51] Int. Cl.⁵ ............................................. E04H 12/18
[52] U.S. Cl. ...................................... 52/109; 135/102; 135/110; 52/646
[58] Field of Search .................. 52/109, 646; 135/102, 135/110

[56] References Cited

U.S. PATENT DOCUMENTS

| | | | |
|---|---|---|---|
| 3,710,806 | 1/1973 | Kelly | 52/109 |
| 3,968,808 | 7/1976 | Zeigler | 52/109 |
| 4,276,726 | 7/1981 | Derus | 52/109 |
| 4,437,257 | 3/1984 | Zeigler | 52/109 |
| 4,557,083 | 12/1985 | Zanardo | 52/109 |
| 4,58,0375 | 4/1986 | Nadskov | 52/109 |

FOREIGN PATENT DOCUMENTS 1495511 9/1967 France ................................... 52/109

OTHER PUBLICATIONS

Instand 100 series publication 6 pages; no date; copy filed in 52/109.

*Primary Examiner*—Henry E. Radaazo
*Attorney, Agent, or Firm*—Paul J. Cook

[57] ABSTRACT

A deployable three dimensional structure is provided formed from at least three circumferential scissors like elements joined together and at least three radial scissors like elements joined together. The scissors like elements are formed from two rods joined to each other at a pivot. The structure is foldable into a closed compact state and deployable into an open erect state.

14 Claims, 6 Drawing Sheets

DEPLOYABLE STRUCTURES

This is a continuation of co-pending application Ser. No. 101,705 filed on Sep. 28, 1987 and now abandoned which is a cont. of Ser. No. 874,334 (Jun. 12, 1986) and now abandoned.

FIELD OF THE INVENTION

The invention is generally concerned with structural modules and with three-dimensional assemblies and structures formed from the structural modules which are foldable into a closed, compacted state and deployable into an open erected state.

BACKGROUND OF THE INVENTION

Foldable or collapsable structures can be folded after they are constructed, transported as a folded construct, and then deployed at a chosen site on demand. They also can be closed, stored and redeployed again if necessary. Although there is no reason according to basic engineering principles why such three-dimensional structures cannot be developed in a variety of forms, only a very few have actually been designed. A major reason for this phenomenon is that such three-dimensional structures must satisfy at least three different kinds of design constraints. First, the structure must have a desirable final and initial geometry (which is determined by the use of the structure); these are termed geometric constraints. Second, the structure must be stable in at least two specified positions—an open, erected state and a closed, compacted state; these are termed kinematic or stabilizing constraints. Third, the structure must be deployable into an erected state without distintegrating in the process or without causing component failure during deployment; these are termed mechanical constraints. Design parameters for making structures which satisfy all three major constraints have proven extremely difficult to formulate. In addition, commercially useful, foldable and deployable three-dimensional structures place additional demands on structural strength, strength to weight ratio, ease of construction, demonstratable mechanical properties in the organizational constituents, flexibility of design to satisfy a wide variety of geometric forms, ease of deployment for the structure in a variety of different environments and attachments for covering membranes, pre-fabricated components and other secondary attachments.

It has been disclosed by U.S. Pat. Nos. 3,968,808; 4,026,313; and 4,290,244, respectively to Zeigler to form deployable structures that are "self-stabilized" by the use of "self-locking" stresses which he claims is necessary for the structure to hold itself in place. These "self-locking" stresses are induced by bending and twisting of certain structural members formed of scissors-like elements. Because some of the structural forms are superficially similar to the present invention of Zeigler and because these known structures share some constituent parts in common with the present invention, a detailed summary of these Zeigler structures is deemed beneficial.

The Zeigler structures generally are a network of scissors-like elements which extend in three dimensions to form, for example, flat structures, semicylindrical structures, semispherical structures and a combination of these. The shell framework is constructed of scissors-like elements formed of two rods which are crossed into pairs, the majority of which are pivotally joined by a pin to form the element resembling scissors. The ends of each scissors-like element are joined into a series of outer apical points and a corresponding series of inner apical points, which define the outer and inner geometric configuration on the structure. A series of crossed pairs of rod elements extend arch-like to form a series of ladders spaced in parallel positions. Each of the inner and outer apical points includes a hub member. Within this structural framework the following features are plainly evident. In the Zeigler structure, when one neglects the stresses caused by gravity, there exist stresses in the deployed structure caused by intentional bending the rods forming the scissors-like elements. The slight bending of the rods keeps the structure stable and produces what is termed cumulative "self-locking stresses". These "self-locking stresses" are said to be necessary for the structure to be self sustaining. Unfortunately, introducing this residual self-locking stress wherein the rods are bent affects the geometry, kinematics and its dynamic behavior. It adversely affects structural strength of the fully deployed structure.

In order to introduce the requisite "self-locking stress" for the structure to be self-supporting in the fully erected state, some of the rod elements are buckled in the fully deployed state. In this manner, redundant stresses are introduced into the structure by bending or actually buckling several of the rod elements into a permanently twisted orientation. The alleged advantage of twisting the structure is said to be two-fold. During deployment, the twisting action is said to force the individual rod elements into their proper places and help the structure "click" or stabilize. After deployment, the twisting action is said to help lock the structure into its final configuration. In point of fact, the buckling and twisting of individual rod elements in the fully deployed state is not necessary. The buckling and twisting greatly reduces the load-carrying capability of the rods and thus the structure as compared to a structure wherein the individual rods are not twisted or bent. The axial load-carrying capability of the rods is drastically reduced by bending it. Zeigler refers to his structures as "self-sustaining" structures. The buckled nature of the rods dramatically reduces the load-bearing capability of his structures. The buckled nature of the rods prevents him from using telescopic elements to replace the rods.

During deployment, some of the forces in the crossed pair of rod elements are so great that the individual rods forming a single scrissors-like unit are forced apart from each other. In some cases to avoid the destructive effects of these buckling forces, either the pivotal connection between the individual rod elements is removed or the pivotal point is purposely designed to permit a free sliding relationship between the individual rod elements. In some cases, complete scissors are removed from the structure.

In U.S. Pat. No. 3,968,808, Zeigler claims that ". . . structural integrity results from a relationship among the rod-like elements which is attained by and incidental to the erected shape itself and which does not rely upon physical constraint as pivotal connections among rod elements." But the nature of the Zeigler geometry forces the introduction of a host of extraneous mechanisms to render the structures of U.S. Pat. No. 4,290,244 practical (see FIGS. 3, 4, 5 and 6). Also, Zeigler states that the rods connected to the central inner apical points of the structure lie in a flat plane. Zeigler provides an entire class of structures which is purposely designed as a series of scissors-like ladders comprising joined rod elements criss-crossing each other into organized ladder formats in which at least two points of each ladder have the crossing rod elements disposed in freely slidable relationship and which there are specific alternating zones of sliding and fixed pivotal crossing points of the rod elements. It will be specifically noted that this class of structures is always less stable in the fully erected state due to the absence of pivotal connections between all individual rod elements.

Overall, therefore, it is apparent that these Zeigler structures contain inherent defects and flaws and place specific limitations on the intended user as regards geometric, kinematic, mechanic and structural strength (bad load-carrying capability). In particular it would be a recognized advantage and major advance for structural frameworks and assemblies to assume a stress-free state in at least the open and closed positions; to avoid use of redundant forces which buckle, bend or twist constituent parts of the structure in the final deployed configuration; to avoid permanent deformation of any structural component; and to provide the user with arbitrarily flexible design parameters such that any geometric configuration and set of dimensions and specifications can be met.

SUMMARY OF THE INVENTION

A three-dimensional, load-bearing structural module when joined with other structural modules forms a structure which is foldable into a closed, compacted state and deployable into an open erected state. The structure can be either self-stabilizing or can be stabilized by exterior means. The structural module is formed by joining together a plurality of scissors-like elements formed from two rods joined together at an intermediate point along their length. Two adjacent scissors-like elements are joined together at two points, referred to respectively as the inner apical point and the outer apical point which are formed because the scissors-like elements are in a partially open position. Radial scissors-like elements joined at the apical points extend radially from the apical points. Scissors-like elements circumferentially positioned in each structural unit connect the radially outermost ends of the radially extending scissors-like elements. The number of circumferentially positioned scissors-like elements referred to a circumferential scissors-like element is equal to the number of radially extending scissors-like elements so that all ends of all rods connect to at least two rods in two other scissors-like elements.

The structure is formed by joining structural units to each other at the circumferential scissors-like elements. At the point where two structural units are joined, the units share a common scissors-like element. The structural unit is characterized by:

a) all rods are straight when the structural unit is deployed (neglecting minor effect of rod and pivot diameters, both radial and circumferential);

b) either the lines defined by the intersection of the planes defined by each scissors-like element (1) do not intersect each other and are parallel to each other or (2) the lines defined by the intersection of the planes defined by each scissors-like element converge to a single focal point;

c) in Class I structures, at connecting scissors-like elements, the sum of the distance between the pivot point of a first scissors-like element to each of the two hinges is the same as the sum of the distance from the pivot point of a second connecting scissors-like element to each of the same two hinges;

d) in Class I structures, the geometry of all of the circumferential scissors-like elements is the same.

Some of the rods in the self-stabilized structural module are slightly bent in intermediate positions between the folded position and the fully deployed position, but are all straight in the fully deployed position. Thus, to fold the structural module, a force would have to be exerted sufficient to overcome the force of the rods when in the intermediate bent position. In the externally stabilized structural module, the rods are not bent at an intermediate position, so that little force is required to deploy the structural module. This is accomplished by structuring the pivot points in each scissors-like element so that they are movable, e.g., slidable and the rods are extendable and extraneous mechanisms are used to lock the structure into its desired final configuration.

DETAILED DESCRIPTION OF THE DRAWINGS

The present invention may be more fully and easily understood when taken in conjunction with the accompanying drawings in which.

DETAILED DESCRIPTION OF THE PREFERRED EMBODIMENTS

Figure 1:
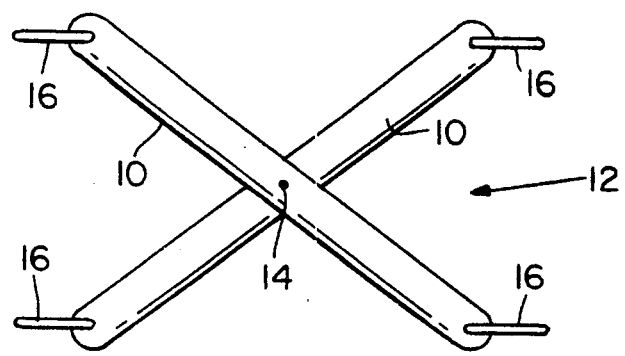
FIG. 1 illustrates a scissors-like elements used to produce a self-stabilizing structure.

The present invention provides a class of structural units and structures which can be folded into a closed compacted state and then deployed at will into an open erected state. A wide variety of different structures varying in geometric configuration, choice of materials and specific dimensions can be made. Each structural unit representing an embodiment of the invention is constructed using a plurality of adjacently positioned scissors-like elements, each element defining a flat plane. Each scissors-like element or SLE is composed of two rods which rotate in this plane fixed at the pivot joining the two rods. The ends of the joined rods forming a scissors-like elements are connected by hinges to rod ends of at least one adjacently positioned scissors-like element. The combination of the adjacently positioned, planar, scissors-like element connected by the pairs of hinges forms a structure of predetermined configuration and dimensions.

One embodiment of this invention has the feature that during deployment, some of the individual rods comprising scissors-like elements temporarily deform. This embodiment will be referred to herein as the Class I embodiment. Nevertheless, each of these temporarily deformed rods resume their original straight stress-free state, when the structure as a whole is in the fully deployed state, thereby causing the structure to be self-stabilizing. This phenomenon is readily observable in the physical structure: when the structure reaches a stress-free state, it visibly stabilizes or "clicks" into place. The ability to be self-stabilizing, self-supporting and load-supporting in the open, erected state without use of external restraints or rigidifying means and without internal stress on the constituent scissors-like elements and hinges is a benefit and advantage previously unknown and unavailable in the art.

A second embodiment of this invention has the feature that, during deployment, some of the individual rods comprising scissors-like elements extend or contract freely. At the desired final configuration, the structure will be stabilized by external means. For example, locking pins, or other mechanisms can be used to prevent the rod from elongating or contracting. External cables or structural components can be affixed to provide the desired stability. This second embodiment will be referred to herein as Class II structural modules. The geometry of the Class II structural module is derived from the Class I module. Because of the extending rods, the shape of the module could be altered to form a structural shell of any shape. In the final configuration, all rods will be straight and untwisted and, therefore, free of internal stresses.

Several other major advances and advantages are offered by the present invention. The structures provided a large strength to weight ratio and design flexibility previously unattainable and unknown. Accordingly, these structures are suitable as deployable and transportable walls, bridges and the like - all of which require high strength and minimum weight.

Class I structures are easy to construct and transport. The structure may be made at a convenient location, folded into the closed, compacted state, transported to the use site and there deployed instantaneously into the open, erected state without difficulty.

The structural units of this invention provide a large variety of mechanical properties. The choice of materials and method of construction for the rods individually, the different types of universal hinges which may be employed to link a series of formed scissors-like elements, the geometry and the structural periphery of the structure is a matter of choice or desire for the individual user.

The Class II structures may be arbitrarily varied in geometric configuration after it is deployed. There are various degrees of flexibility available to the user made possible by altering the length of the rods and altering the position of the pivots joining the rods of individual scissors-like elements. The configuration and dimensions of each embodiment is solely the choice and product of the individual designer. Virtually any reasonable structural shell can be fabricated.

The Class II structures are easy to deploy because they are stress-free when they are fully closed, during deployment and in the fully open positions. Since there is no deformation during deployment, deployment will require less force than that required when deploying the Class I structures. However, they are unstable until they are stabilized by external or built-in means, such as cables or locks or the like.

Both Class I and Class II structures avoid the use of components that are deformed after deployment. There is a total absence of permanent deformation and/or buckling in the scissors-like element comprising each structure. Both the Class I and II structures avoid and eliminate the use of residual or internal stress loads within the overall structure for stability after deploymnet. Contrary to prior art frameworks, the constituent parts of each structure in the fully open or fully closed position are in a stress-free state.

The Class I structures are symmetrical about a common central axis along which a single central outer apical point and a single central inner apical point lie in substantial alignment. However, the Class II structures need not be symmetrical.

Figure 2:
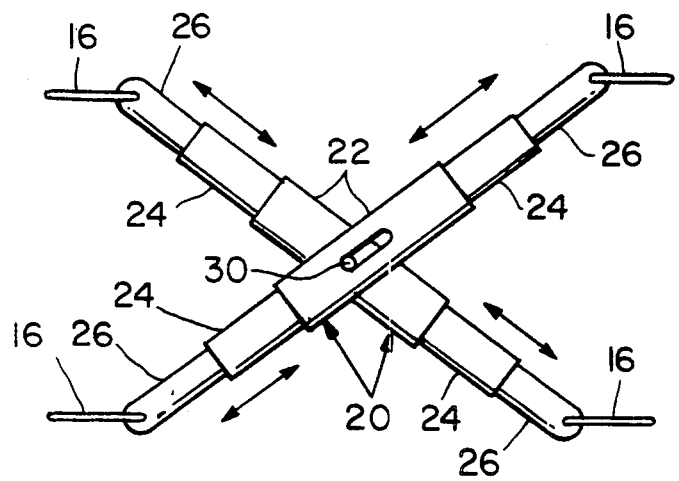
FIG. 2 illustrates a scissors-like element used to produce a externally stabilized structure.
Figure 3:
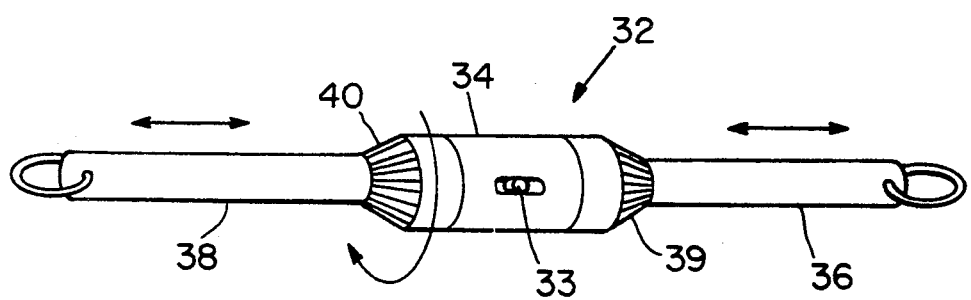
FIG. 3 illustrates an alternative rod construction used to form a scissors-like element of an externally stabilized structure.

The fundamental, essential component which is utilized repeatedly in making the present invention is the scissors-like element or "SLE". Each scissors-like element comprises two rods which are crossed and rotably joined at a pivot. Different embodiments of rods suitable for use in a SLE are illustrated by FIGS. 1, 2 and 3. The rod 10 seen in FIG. 1 is formed as single piece using a wide variety of metal and nonmetallic materials. The degree of resiliency, rigidity and the specific dimensions of the rod 10 may be varied to meet the user's requirements or desires. Similarly, the means for making the rod 10 are well established in the art. It shoulkd be noted, however, that the rod 10 may be a solid or eliptical or any other shape of any cross-section. The pivot also can be designed in a variety of ways allowing the rods to rotate about it. The SLE 12 shown in FIG. 1 is formed from two rods 10 joined by a pivot pin 14 at an intermediate point along the lengths of both rods 10. Rings 16 are attached pivotally to each end of the rods 10 and provide a means for attaching SLEs together by passing the ring 16 through the ends of each rod 10 to be attached to each other. An alternate embodiment is illustrated by the rod 20 of FIG. 2 in which a series of concentric rods 22, 24, and 26 are joined in telescopic fashion. The SLE shown in FIG. 2 is used to form a Class II structural unit. Each section 22, 24 and 26 is joined to another section using any means which permit the length of the rod to fold up or be extended to any length up to the fully extended distance. Any means for securing the individual sections at the desired length may be used each of the indicated sections. This allows the user to lengthen or shorten any individual rod after it has been joined to another rod at a pivot 30. In this manner, the dimensions of individual SLEs may be altered after the structure ahs been deployed or folded to meet design requirements.

The pivots used to rotably join any two crossed rods can be fixed to produce the Class I structural units or can be fixed or to be movable to produce the Class II structural units. Pivots may take two forms: locking and non-locking. Non-locking pivots comprises those pins, shafts and other means which are not permanently fixed at one position on the rod; rather, locking pivots may be secured and subsequently unsecured from one position on the rod and then subsequently moved to another position on the rod where it is again secured. Once secured at a given site on the rod, the pivot joins and retains the crossed rods at that point of juncture. The mechanical characteristics of locking and nonlocking pivots may be altered by incorporating a variety of conventional springs, dashpots, electro-mechanical devices or pneumatic devices in them. Similarly, friction pads and other energy-absorbing articles may also be incorporated into the pivot to damp out mechanical vibrations.

An alternative rod construction for forming a Class II structural unit is shown in FIG. 3. The rod 32 having a pivot 33 comprises a central cylinder 34 into which rods 36 and 38 can slide into or out from. Rods 36 and 38 are positioned to the desired length, they are locked in place by rotaing nuts 39 and 40.

An essential requirement of the present invention is that the ends of the joined rods forming a scissors-like element can be connected by hinges to the rod ends of at least one adjacently positioned scissors-like element. For Class I structures, the requirement for foldability between adjoining scissors-like units, an additional condition for foldability is: that the sum of the distance between the pivot of a first SLE in each of two hinges is the same as the sum of the distances from the pivot point of a second SLE to each of the two hinges.

Figure 4:
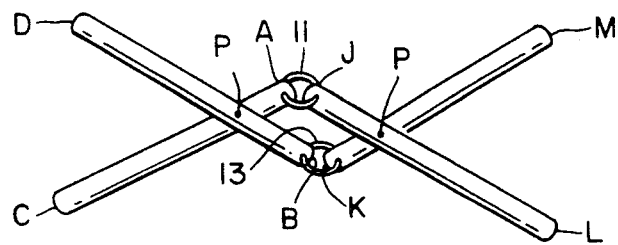
FIG. 4 illustrates two scissors-like elements of FIG. 1, joined together.

As shown in FIG. 4, a Class I structural element ABCD is joined by a pair of hinges 11 and 13 respectively to a unit JKLM. Pivot point $P_1$ need not be equidistant from the rod ends A, B, C, or D. Similarly, it will be seen that the pivot $P_2$ need not be equidistant fromn the rod ends J, K, L or M. It is again emphasized that the distance from $P_1$ to A need not be equal to the distance from $P_1$ to B and need not be equal to the distance from $P_2$ to L or from $P_2$ to K. Rather the condition for foldability requires only that the sum of the distance from $P_1$ to A and the distance from $P_1$ to B be equal to the sum of the distance from $P_2$ to L and from $P_2$ to K.

Figure 5:
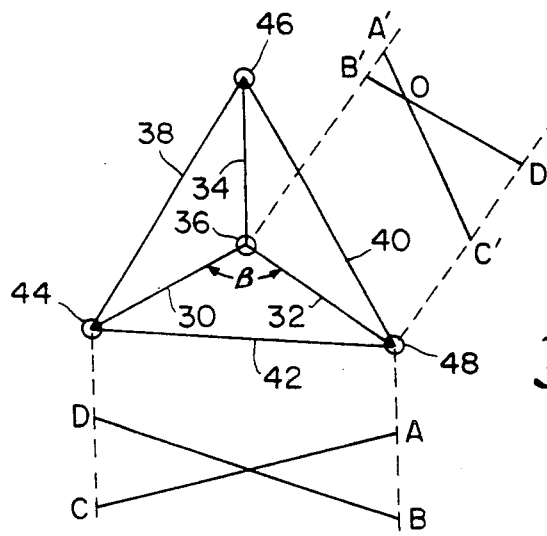
FIG. 5 illustrates a three sided embodiment of a triangular Class I flat structural unit.
Figure 6:
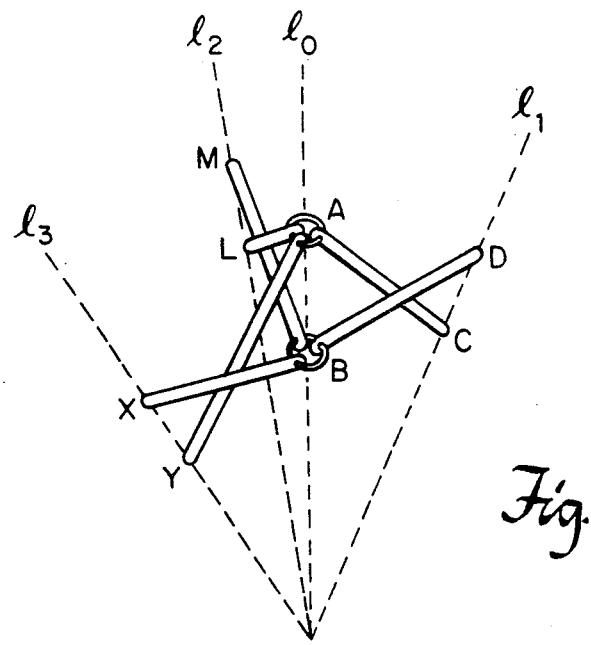
FIG. 6 is an isometric view of radial structural elements for forming a triangular Class I curved structure.

An orientation of three radial scissors-like units is illustrated in FIG. 6 for forming Class II structures in which the element ABCD is radially connected by universal hinges. FIG. 6 presents a schematic format in which $1_0$ passing through AB, $1_1$ passing through DC, $1_2$ passing through ML and $1_3$ passing through XY converge to focal point O. This is an example of a Class I radial structural structural which are used to form curved Class II structures. A Class I flat triangular module embodying the present invention is illustrated by FIG. 5. The projections of the SLEs shown in FIG. 5 are 90° to that of the top view shown in FIG. 5. The angle beta formed by the units 30 and 32 is 120° and is produced by the junction of units 32 and 34 respectively and by the junctions of units 34 and 30 respectively. The preferred embodiment of the scissors-like unit used in making the stabilizing network comprising units 34, 30 and 32 is the unit A' B' C' D' where the pivot joining the two rods is not equidistant from the rod ends. In addition, the rod A'C' may or may not be identical in length to the rod B'D'. The ring 36 represents the radial connection of rod end A' and/or rod end B' individually to its counterparts by a single pair of universal hinges 36 and comprises the outer apical point. The ring 37 represents the inner apical point. The stabilizing network is connected to the perimeter network at the hinge connections uniting the units 38, 40 and 42. It will be recalled that in the schematic format of FIG. 5, each of the universal hinges 44, 46 and 48 represent a pair of universal hinges as seen in FIG. 6. In preferred embodiments, the units 38, 40 and 42 are identical as represented by the unit ABCD.

Figure 7:
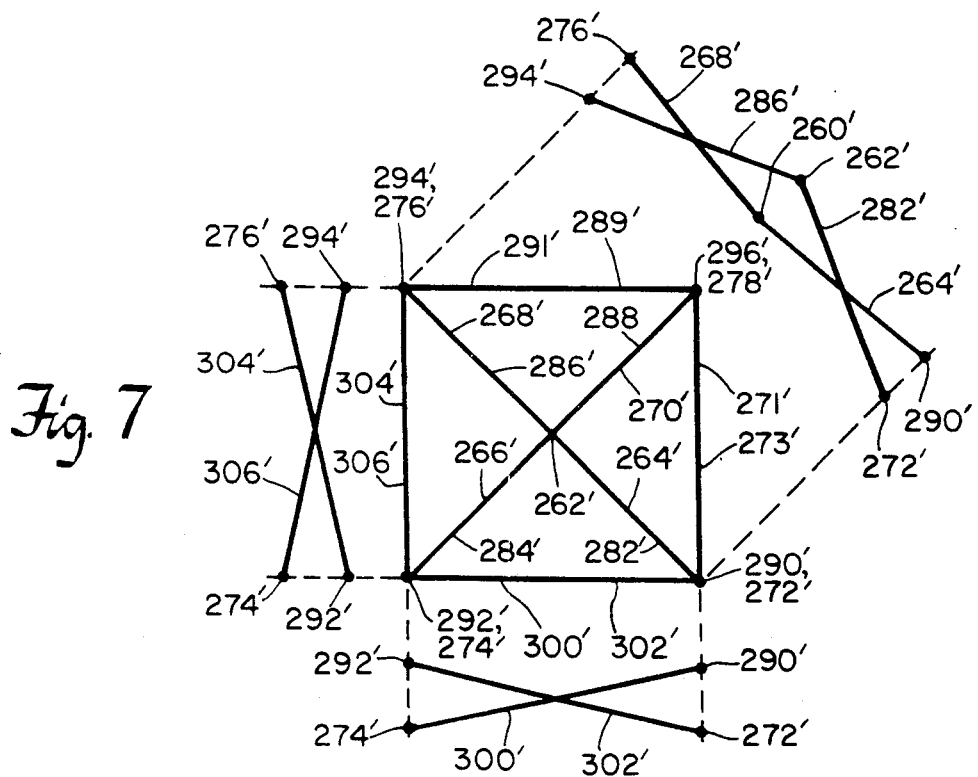
FIG. 7 illustrates a square Class I flat structural unit of this invention.

A Class I flat square embodiment employing eight scissors-like units is illustrated in FIG. 7. The structural module has an inner apical point 260' and an outer apical point 262'. Rods 264' and 282' are joined together and extend from the apical points to ends 272' and 290' respectively. The rods 268' and 286' are joined together and extend from the apical points to ends 276' and 294' respectively. Similarly, rods 304' and 306' form ends 276', 294', 274' and 292' and rods 300' and 302' form ends 274', 292', 290', and 272'. As shown in FIG. 7, the lines formed respectively by ends 276' and 294'; 274' and 292'; 272' and 290'; and 296' and 278' as well as the lines formed from apical points, 260' and 262' are parallel to each other. Thus, the rods forming the SLEs of the structural module are not bent or twisted and, therefore, are free of bending or twisting stresses when the module is deployed.

Figure 8:
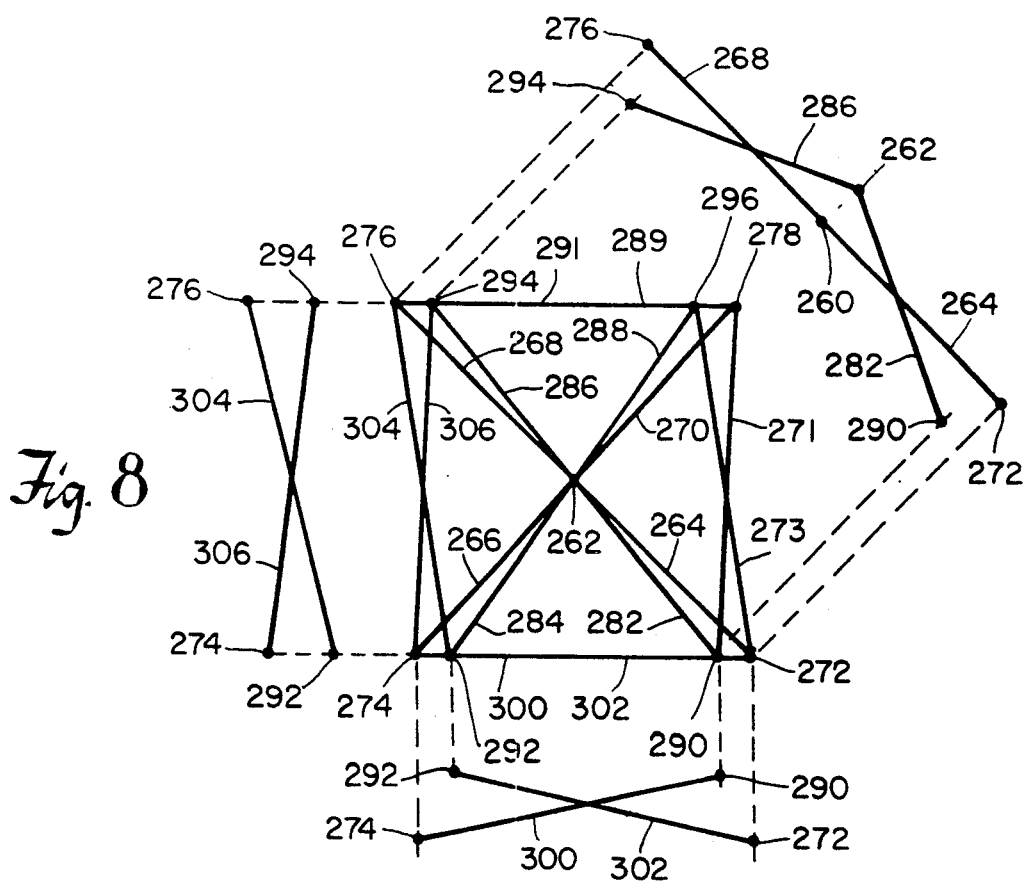
FIG. 8 illustrates a four sided embodiment of a structural unit of the prior art.

The structural module shown in FIG. 7 is to be contrasted and differentiated from superficially similar prior art structures whose organizational and stress-loading differ significantly from the present invention. For comparison purposes only, a four-sided polygon structure described in U.S. Pat. No. 4,290,244 (as original FIG. 10) is reproduced herein as FIG. 8. The prior art structure of FIG. 8 represents an arrangement of crossed rod elements in which the inner apical point centrally disposed in the arrangement is indicated by the reference character 260 and wherein the central outer apical point corresponding thereto is indicated by the reference character 262. In this configuration, four rod elements radiate essentially from the inner apical point 262 and these are indicated by the reference characters 264, 266, 268 and 270. The outer ends of these rod elements define corresponding outer apical points 272, 274, 276 and 278. Correspondingly, the four rod elements 282, 284, 286 and 288 extend from the central outer apical point 262 and define at their free end the corresponding inner apical points 290, 292, 294 and 296 respectively. Each of the four sides of the arrangement of FIG. 7 is provided with a cross pair of rod elements which join the four apical points in question. However, two of the diametrically opposed sides of the configuration of FIG. 8 are characterized by the fact that the inner apical points are more closely spaced than the outer apical points. Thus, the two inner apical points 292 and 290 are more closely spaced than their corresponding outer apical points 272, 274, 276 and 278. On these unequally spaced sides, the corresponding apical points are joined by pairs of cross rod elements such as those indicated by the reference characters 300 and 302. The remaining sides have equally spaced inner and outer apical points. These equally spaced sides have their inner and outer apical points joined by cross pairs of rod elements such as those indicated by their reference characters 304 and 306 respectively. As shown in FIG. 8, SLEs formed of rods 300 and 302 and the SLEs 291 and 298 in parallel planes. However, SLEs made of rods 306 and 304; 268 and 286; 288 and 270; 264 and 282 as well as 284 and 266; 271 and 273; lie in planes that are not parallel. Also, the planes cannot meet in a single focal point as planes defined by SLEs 300 and 302; and SLEs 291 and 289; are parallel and will never meet. Thus, the prior art structure is quite different from the structures of this invention since the Class I flat structures are made from SLEs, but are in parallel planes. This prior art structure also is different from Class I curved structures (see FIGS. 11 and 12) since the SLEs do not lie in planes that meet at a single focal point.

Figure 9:
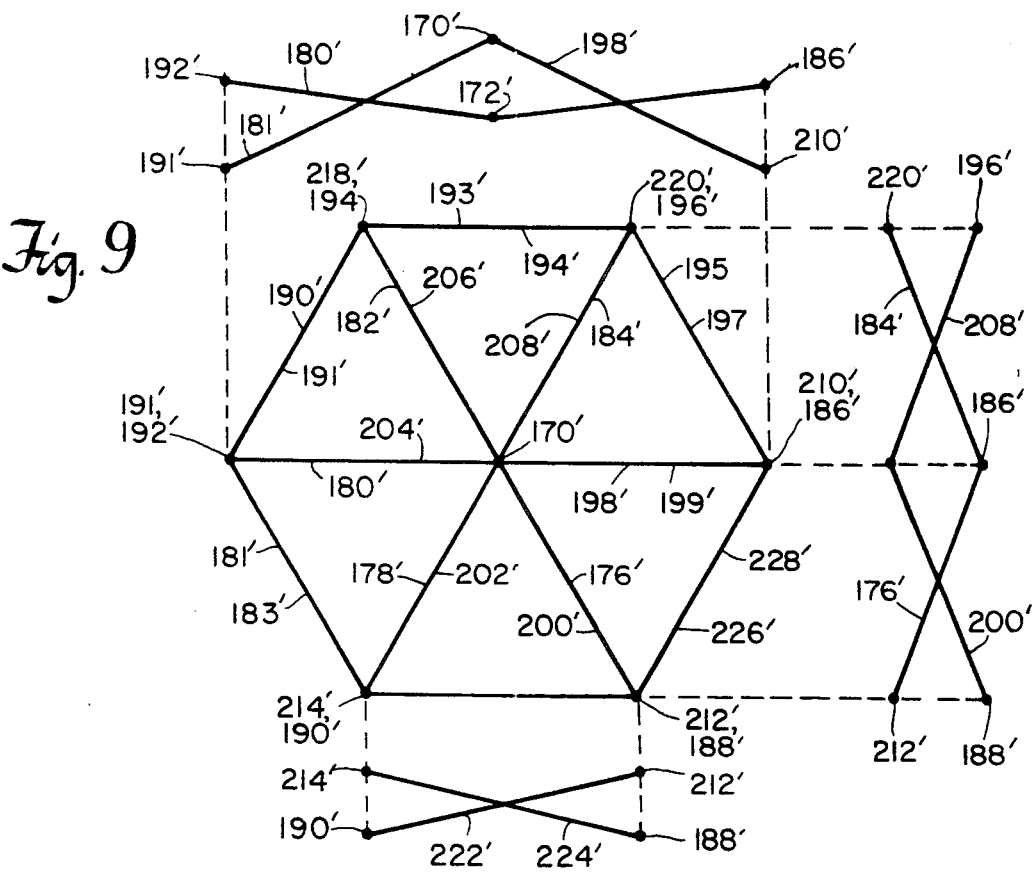
FIG. 9 illustrates a hexagonal Class I flat structural unit of this invention.

An alternate embodiment employing twelve scissors-like units is shown in FIG. 9. The structural module has an inner apical point 172' and an outer apical point 170'. Rods 180' and 181' are joined together and extend from the apical points 170' and 172' to ends 191' and 192' respectively. The rods 198' and 199' extend from the apical points 170' and 172' to ends 186' and 210'. The rods 184' and 208' extend from ends 186' and 210' to ends 220' and 196'. The rods 176' and 200' extend from ends 186' and 210' to ends 188' and 212'. The rods 222' and 224' extend from ends 182' and 212' to ends 190' and 214'. As shown in FIG. 9, the lines formed by the following sets of points from parallel lines: 191' and 192', 194' and 218', 196' and 220', 186' and 210', 188' and 212', 190' and 214' and 170' and 172'. Thus, all of the rods forming the SLEs which make up the structural module of FIG. 9 are neither twisted nor bent when the structural module is deployed. In FIG. 9, all inner SLEs are defined by (182', 206') (208', 184') (198', 199') (200', 176') (202', 178') (204', 216'); outer SLEs are defined by (190', 191') (193', 194') (195', 197') (228', 226') (222', 224') (181', 183').

For purposes of comparison, the hexagonal-shaped structural module shown in U.S. Pat. No. 4,290,244 (original FIG. 7) is reproduced herein as FIG. 10.

Figure 10:
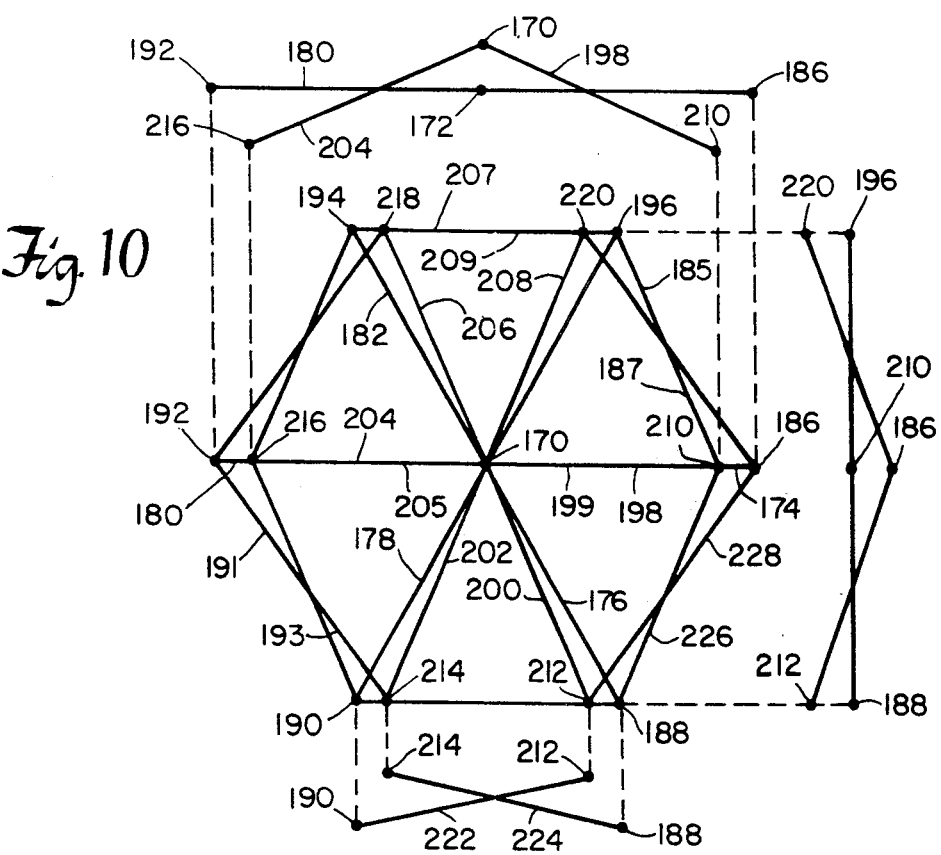
FIG. 10 illustrates a six sided embodiment of a structural unit of the prior art.

The prior art structure of FIG. 10 represents an arrangement of ctossed rod elements in which the inner apical point centrally disposed in the arrangement is indicated by reference character 172 and wherein the central outer apical point corresponding thereto is indicated by the reference character 170. In this configuration, six rod elements radiate essentially from the inner apical point 172 and these are indicated by the reference characters 174, 176, 178, 180, 182 and 184. The outer ends of these rod elements define corresponding outer apical points 186, 188, 190, 102, 194 and 196. Correspondingly, the six rod elements 198, 200, 202, 204, 406 and 208 extend from the central outer apical point 172 and define at their free end the corresponding inner apical points 210, 212, 214, 216, 218 and 220 respectively. Each of the six sides of the arrangement of FIG. 10 is provided with a cross pair of rod elements which join the six apical points in question. However, two of the diametrically opposed sides of the configuration of FIG. 10 are characterized by the fact that the inner apical points are more closely spaced than the outer apical points. Thus, the four inner apical points 212, 214, 204 and 210 are more closely spaced than their corresponding outer apical points 188, 190, 186 and 192. On these unequally spaced sides, the corresponding apical points are joined by pairs of cross rod elements such as those indicated by the reference characters 222 and 224. The remaining sides have equally spaced inner and outer apical points, e.g. 220-196 and 212-188. These equally spaced sides have their inner and outer apical points joined by cross pairs or rod elements such as those indicated by the reference characteristics 226 and 228 respectively.

As shown in FIG. 10, SLEs formed of rods 222 and 224 and the SLEs defined by rods 207 and 209 lie in parallel planes. However, SLEs made by rods 185 and 187; 228 and 226; 222 and 224; and 191 and 193 lie in planes that are not parallel. In addition, the planes cannot meet in a single focal point as in FIG. 12 since the two parallel planes will never meet. Thus, at least some of the rods in this prior art structure must be twisted or bent to accommodate the geometry and form the self-locking stresses.

As is apparent from the comparison of the structures of this invention with the structures of the prior art, the rods extending to the central inner and outer apical points of the prior art must deform to accommodate the configuration; and that the individual scissors-like units must bend or bow into a substantially non-planar stance in order to remain connected to the adjacently positioned units. Equally evident is the fact that these inner apical points, more commonly identified herein as universal hinges of a perimeter network are out of alignment in comparison to their counterparts in the perimeter configuration; it is apparent, therefore, that while the hinges joining the equally spaced sides lie in substantially parallel lines, the two inner apical points out of position do not lie parallel to their counterparts and are out of geometric alignment to any linear plane. The prior art structure illustrated by FIGS. 9 and 11 herein thus violates two basic requirements which must be present in the Class I and II embodiments of the present invention.

Figure 11:
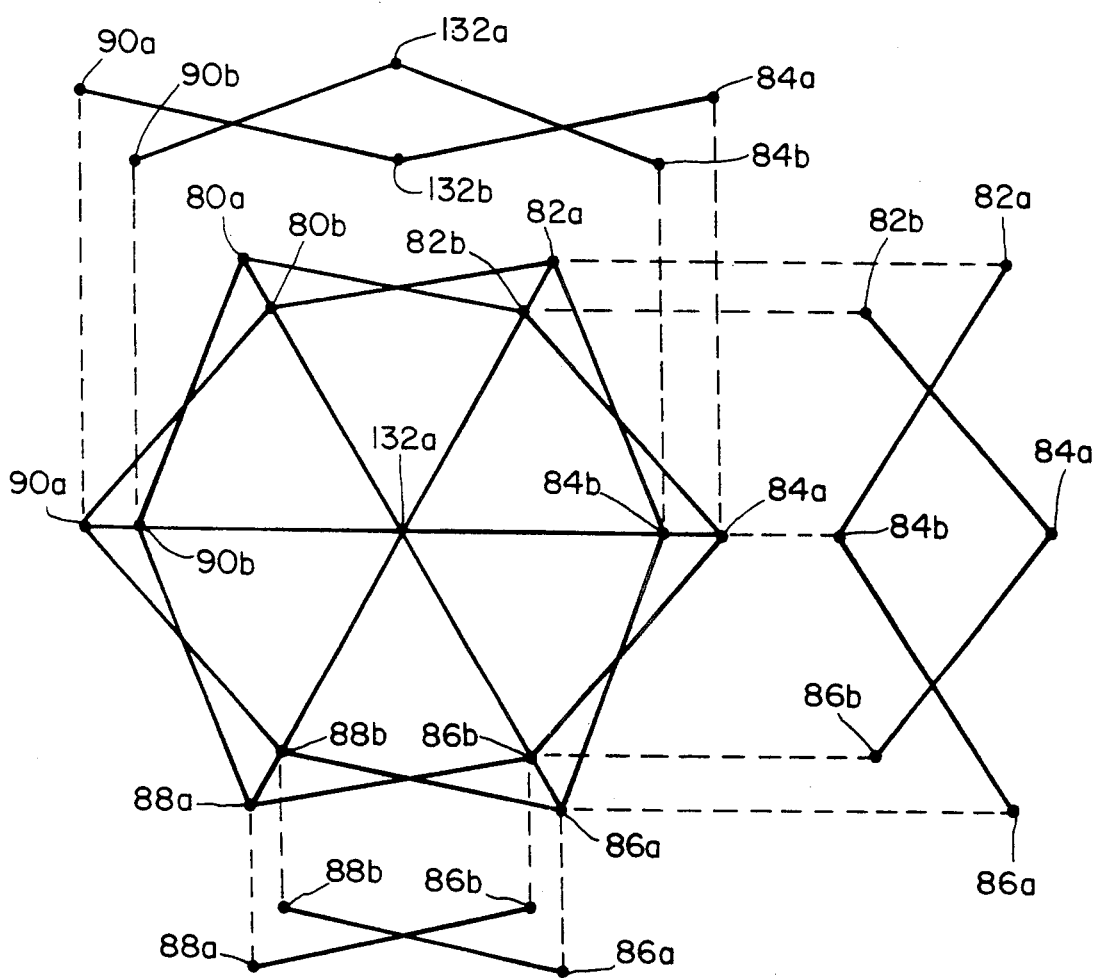
FIG. 11 illustrates a hexagonal Class I curved structural unit.
Figure 12:
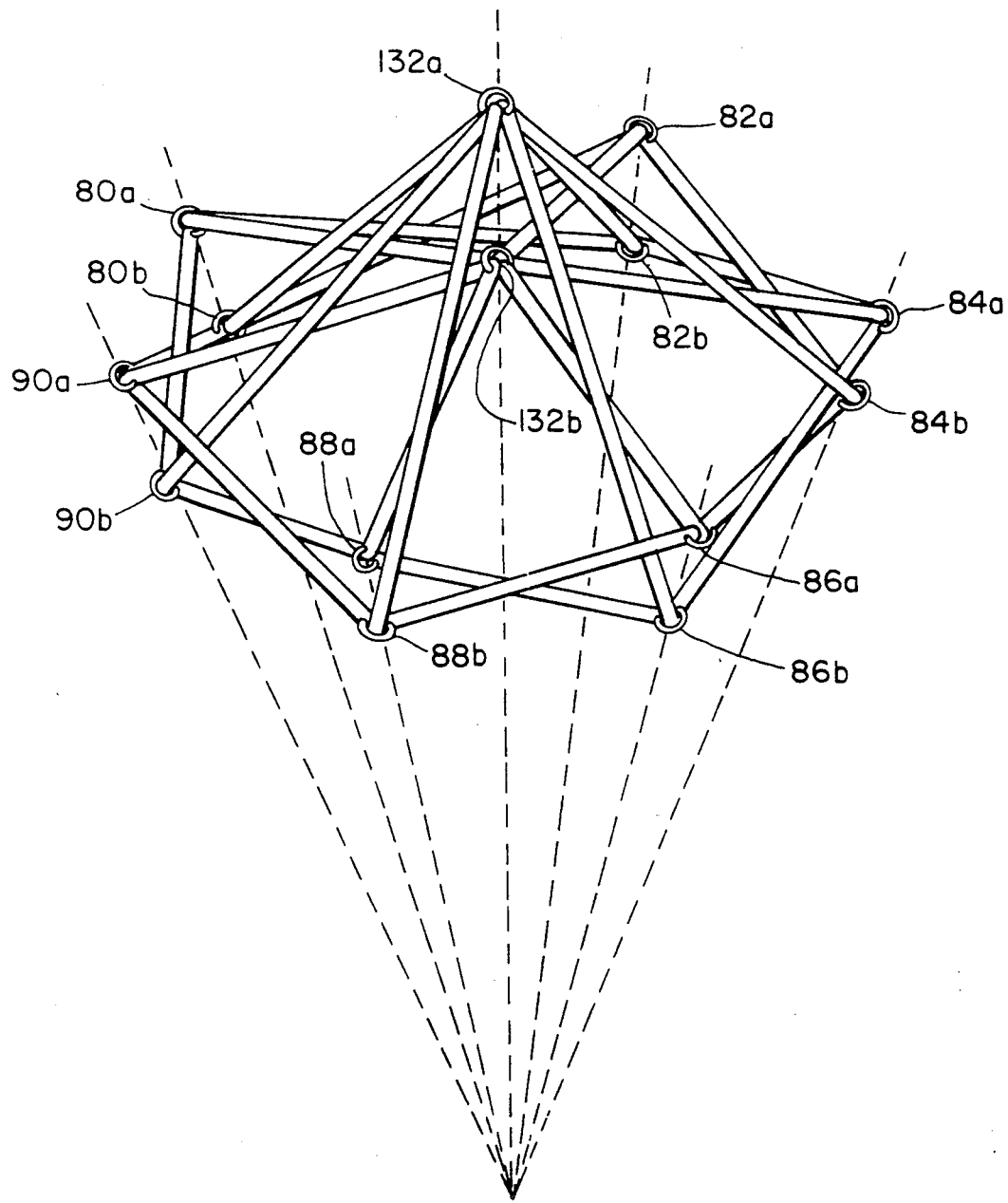
FIG. 12 is an isometric view of the structural unit of FIG. 11.

The perspective view seen in FIG. 12 and top view shown in FIG. 11 identify the central outer apical point 132a and the central inner apical point 132b lying along a common central axis. It will be appreciated that the external network is joined to the perimeter network by each pair of universal hinges 80a and 80b, 82a and 82b, 84a and 84b, 86a and 86b, 88a and 88b, and 90a and 90b respectively. For Class I structures, the conditions for foldability are met in that the sum of any two lengths as measured by the distance from a pivot to each rod end forming one hinged side of a scissors-like unit is equal to the sum of the two lengths as measured by the distance from the pivot to each rod end of any adjacently positioned scissors-like unit connected to the same hinge. Furthermore, as readily seen in FIG. 12, all the hinges in the structure lie exclusively in linear planes intersecting at a single focal point. Moreover, when the Class I structure is in the open, erected state as illustrated by FIG. 12, the structure is self-supporting and self-stabilizing without use of external restraints and without internal twisting or bending stresses upon any of the scissors-like units.

It will be clearly understood that the embodiments illustrated herein are merely some of the preferred configurations of the present invention taken as a whole. It is expected and intended that many variations utilizing the plurality of scissors-like units in various positionings and orientations will be utilized so that a range of specific geometric configurations and dimensions may be obtained using any single unit. In addition, it is intended and envisioned that multiple embodiments of the invention be used in combination such that an overall architectural scheme and assemblies comprising many individual structures joined together are utilized in a variety of geometric configurations so that a continuity of form is achieved. In this manner, both flat (non-shperical) overall assemblies and curved surface assemblies may be formed without difficulty.

It will be understood that embodiments of the present invention may be deployed in a variety of ways to meet individual circumstances and constraints (combination of Class I and Class II units). Combinations of individual structures combined as an assembly to form bridges, portable grandstands, walls, towers and the like may be deployed. The point of force application and method of force application may be varied arbitrarily. For example, by putting springs on various points on the structure, the embodiment may be designed so that it springs automatically into its open, erect state; external force would then be applied to close and fold the structure. Deployment, however, in this particular case would require only a release of the restraining force. Such an automatic deployment mechanism would be useful for an antenna deployment in satelite manned and unmanned outer space use. The spring-loaded structure is deployed by a release of latches. Other means for deploying the entire class of structures comprising the present invention will also incorporate and utilize conventionally known devices and means such as hydraulic or pneumatic devices, cables, pulleys, turnbuckles or the like.

There are many additional features which may be used to advantage with the present invention. It will be expressly understood that these additional features are merely optional devices and improvements whose presence or absence in no way limits or restricts the embodiemtns of the present invention into their various forms and configurations. Some of the optional, additional features include the following.

Addition of Springs and Locks: springs and Locks may be incorporated into any embodiment of the present invention to enhance deployment and stability. Springs may be used to initiate deployment. Mechanical locks may be used to hold the structure in its closed, compacted state and in its fully deployed state.

Addition of Passive and Active Devices: Mechanical devices and electromagnetic devices may be incorporated into each embodiment to give any individual structure special or specific properties. Such additions are extremely usefull in structural frameworks to be utilized in space as they can be used to damp out mechanical vibrations. Various configurations of the structural framework may also be controlled using such devices.

Automatic Deployment: By controlling the stability characteristics of the structure, it is possible to design structures which tend to deploy automatically. Energy for deployment may be stored as bending energy in the rods or springs or a combination of both. Such structures will have to be forcefully closed into the folded, closed position. Once released, like all other mechanical systems, the structure will move towards the most stable, stress-free state where the stored energy is at a minimum. It will, therefore, stabilize in the open, erected state where there is little or no substantial deformation on any of its component parts.

Flexible Embodiments: Due to the individual mechanical behavior of specific materials, rods of peculiar mechanical behavior can be employed in the scissors-like units. In such instances, the overall structural framework may be made to be flexible in some directions and rigid in other directions within the same configuration. This is most suitable in instances where many individual structures are used in combination and is dependant upon some structures maintaining their rigidity whereas as other deployed structures may flex or completely collapse. This would allow the overall assembly architecture significant degrees of flexiblility in the assembly to meet specific requirements.

The present invention is not to be limited in scope nor restricted in form except by the claims appended hereto.

What is claimed is:

1. A three dimensional structural module, foldable into a closed compacted state and deployable into an open, erect state:
   a. at least three circumferential scissors-like elements jointed together end-to-end by hinge means each at a circumferential inner apical point and at a circumferential outer apical point to form a closed circumference;
   b. at least three radial scissors-like elements joined together at one-end to one point to form a central inner apical point and at said one end to a second point to form a central outer apical point and said radial scissors-like element being joined at a second end to a circumferential inner apical point and to a circumferential outer apical point thereby forming a plurality of circumferential inner apical points and a plurality of circumferential outer apical points;
   c. each of said radial scissors-like elements at ends opposite said central inner and central outer apical point being joined to two circumferential scissors-like elements to form one of said circumferential inner apical points and one of said circumferential outer apical points;
   d. each of said scissors-like elements being formed from two rod-like members pivotally joined to each other at a pivot comprising a point intermediate the lengths of said rod-like members;
   e. all of said rod-like members being straight when said structural module is deployed;
   f. the lines defined by the intersection of the planes defined by each scissor-like element do not intersect each other and are parallel to each other;
   g. at connecting scissors-like units, the sum of the distance between the first pivot point of a first connecting scissors-like unit to each hinge means, connecting adjacent connecting scissors-like units is the same as the sum of the distance between the second pivot point of a second connecting scissors-like unit to said hinge means connecting adjacent connecting scissors-like unit.

2. The structure comprising a plurality of the structural module of claim 1 wherein adjacent structural modules are joined at a circumferential scissors-like element joint and said circumferential scissors-like element joint is a common scissors-like unit for said adjacent structural module.

3. The structural module of claim 1 having three to six circumferential scissors-like units.

4. The module of claim 1 wherein at least a portion of said rod-like members having a variable length and means for locking said rod-like members in a stationary position when said module is deployed.

5. A three dimensional structural module, foldable into a closed compacted state and deployable into an open erect state:
   a. at least three circumferential scissors-like elements joined together end-to-end by hinge means each at a circumferential inner apical point and at a circumferential outer apical point to form a closed circumference;
   b. at least three radial scissors-like elements joined together at one-end to one point to form a central inner apical point and at said one end to a second point to form a central outer apical point and said radial scissors-like element being joined at a second end to a circumferential inner apical point and to a circumferential outer apical point thereby forming a plurality of circumferential inner apical points and a plurality of circumferential outer apical points;

c. each of said radial scissors-like elements at ends opposite said central inner and central outer apical point being joined to two circumferential scissors-like elements at one of said circumferential inner apical points and at one of said circumferential outer apical points;

d. each of said scissors-like elements being formed from two rod-like members pivotally joined to each other at a pivot comprising a point intermediate the lengths of said rod-like members;

e. all of said rod-like members being straight when said structural module is deployed;

f. at least some of said rod-like members being variable length;

g. the lines defined by the intersection of the planes defined by each scissors-like element converge to a single focal point.

6. The structure comprising a plurality of the structural module of claim 5 wherein adjacent structural modules are joined at a circumferential scissors-like unit joint and said circumferential scissors-like unit joint is a common scissors-like unit for said adjacent structural module.

7. The structural module of claim 5 having three to six circumferential scissors-like units.

8. The structure comprising a plurality of structural modules, at least one module of claim 1 and at least one module of claim 2 wherein adjacent structural modules are joined at a circumferential scissors-like element joint and said circumferential scissors-like element joint is a common scissors-like unit for said adjacent structural module.

9. A three-dimensional structural module, foldable into a closed compacted state and deployable into an open erect state:

a. at least three circumferential scissors-like elements joined end-to-end together by hinge means, each at a circumferential inner apical point and a circumferential outer apical point to form a closed circumference;

b. at least three radial scissors-like elements joined together at one-end to one point to form a central inner apical point and at said one end to a second point to form a central outer apical point and said radial scissors-like elements being joined at a second end to a circumferential inner apical point and to a circumferential outer apical point thereby forming a plurality of circumferential inner apical points and a plurality of circumferential outer apical points;

c. each of said scissors-like elements being formed from two rod-like members pivotally joined to each other at a pivot comprising a point intermediate the lengths of said rod-like members;

d. all of said rod-like members being straight when said structural module is deployed;

e. the lines defined by the intersection of the planes defined by each scissors-like element converge to a single focal point.

10. The structure comprising a plurality of the structural module of claim 8 wherein adjacent structural modules are joined at a circumferential scissors-like element joined and said circumferential scissors-like element joint is a common scissors-like unit for said adjacent structural module.

11. The structure comprising a plurality of the structural module of claim 9 wherein adjacent structural modules are joined at a circumferential scissors-like unit joint and said circumferential scissors-like unit joint is a common scissors-like unit for said adjacent structural module.

12. The structural module of claim 8 having three to six circumferential scissors-like units.

13. The structural module of claim 9 having three to six circumferential scissors-like units.

14. The structure comprising a plurality of structural modules, at least one module of claim 8 and at least one module of claim 9 wherein adjacent structural modules are joined at a circumferential scissors-like element joint and said circumferential scissors-like element joint is a common scissors-like unit for said adjacent structural module.

* * * * *